United States Patent [19]

Stoliker

[11] Patent Number: 5,795,259

[45] Date of Patent: Aug. 18, 1998

[54] CONTINUOUSLY VARIABLE TRANSMISSION

[76] Inventor: David S. Stoliker, 2560 TJ Dr., Conway, Ark. 72032

[21] Appl. No.: 746,714

[22] Filed: Nov. 15, 1996

Related U.S. Application Data

[63] Continuation-in-part of Ser. No. 711,990, Sep. 10, 1996, abandoned.

[51] Int. Cl.$^6$ ...................................... F16H 15/12
[52] U.S. Cl. .................. 476/33; 476/50; 476/54; 476/57
[58] Field of Search .................. 476/33, 50, 54, 476/57, 58

[56] References Cited

U.S. PATENT DOCUMENTS

| | | | |
|---|---|---|---|
| 833,177 | 10/1906 | Reimers | 476/54 X |
| 1,092,076 | 3/1914 | Morris | 476/24 |
| 1,168,057 | 1/1916 | Buck | 476/24 |
| 1,410,747 | 3/1922 | Gill | 476/66 X |
| 1,738,965 | 12/1929 | Reina | 475/217 |
| 2,858,705 | 11/1958 | Eldridge, Jr. | 476/33 |
| 3,323,384 | 6/1967 | Wodarka | 74/196 |
| 4,137,785 | 2/1979 | Virlon | 74/194 |
| 4,819,494 | 4/1989 | Giuliani et al. | 74/190 |

FOREIGN PATENT DOCUMENTS

| | | | |
|---|---|---|---|
| 689826 | 4/1953 | United Kingdom | 476/33 |

*Primary Examiner*—Allan D. Herrmann
*Attorney, Agent, or Firm*—Ray F. Cox, Jr.

[57] ABSTRACT

A continuously variable transmission in which a ratio transfer bearing whose axis is at right angles to a friction disc against which it interacts by friction is moved across the face of the friction disc to continuously vary the transfer ratio between the two. The ratio transfer bearing is varied by means of a jackscrew operated by a train of bevel gears.

One friction disc and ratio transfer bearing on the input side and a second friction disc and ratio bearing on the output side are connected through an idler bearing against which the two ratio transfer bearings operate. The jackscrews which move the two ratio transfer bearings are operated through the bevel gear linkages in an inverse fashion so that a higher ratio on one friction disc results in a lower ratio on the other friction disc and inversely. By varying the two transfer ratios inversely, a wider range of output ratios is obtainable.

11 Claims, 3 Drawing Sheets

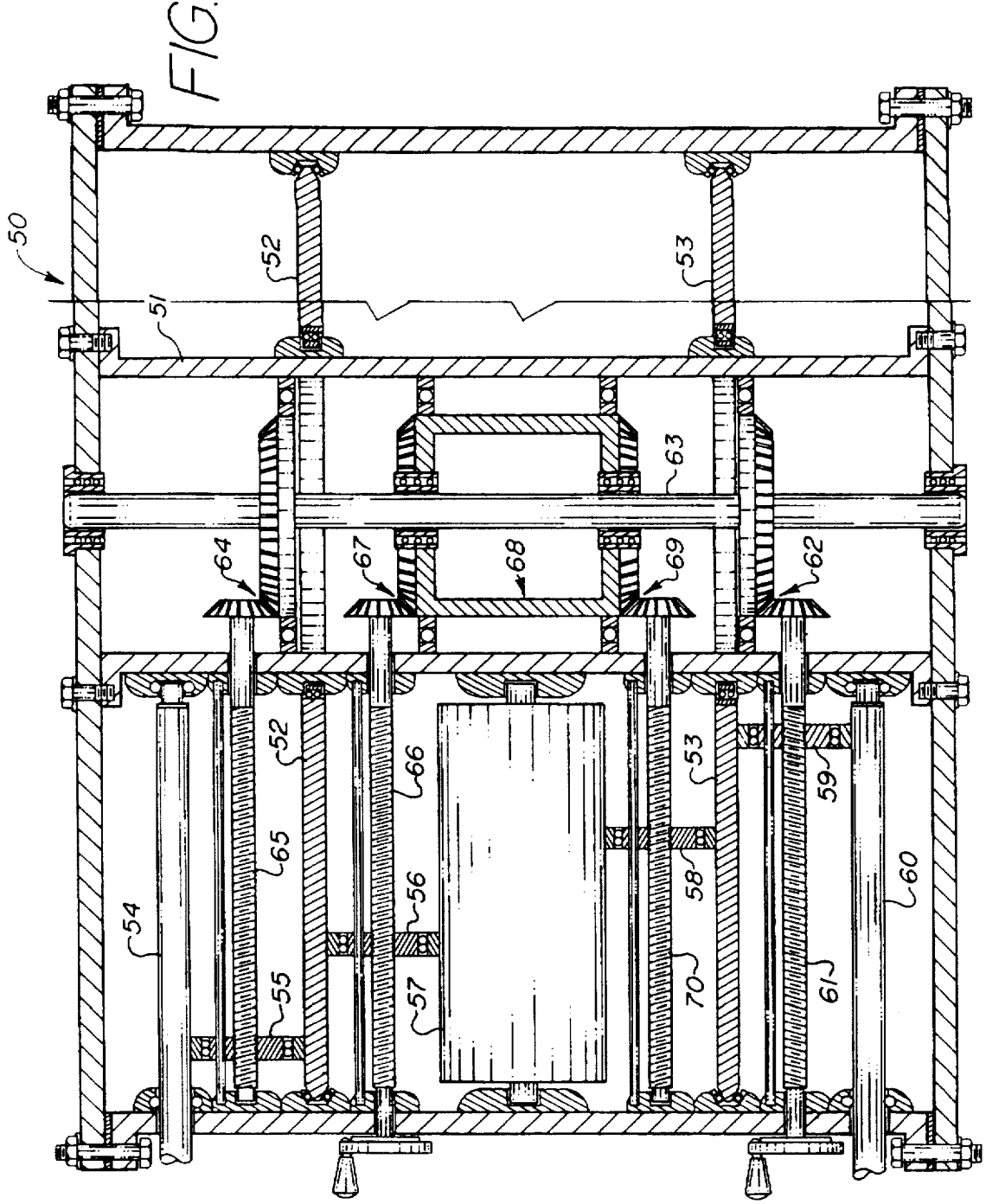

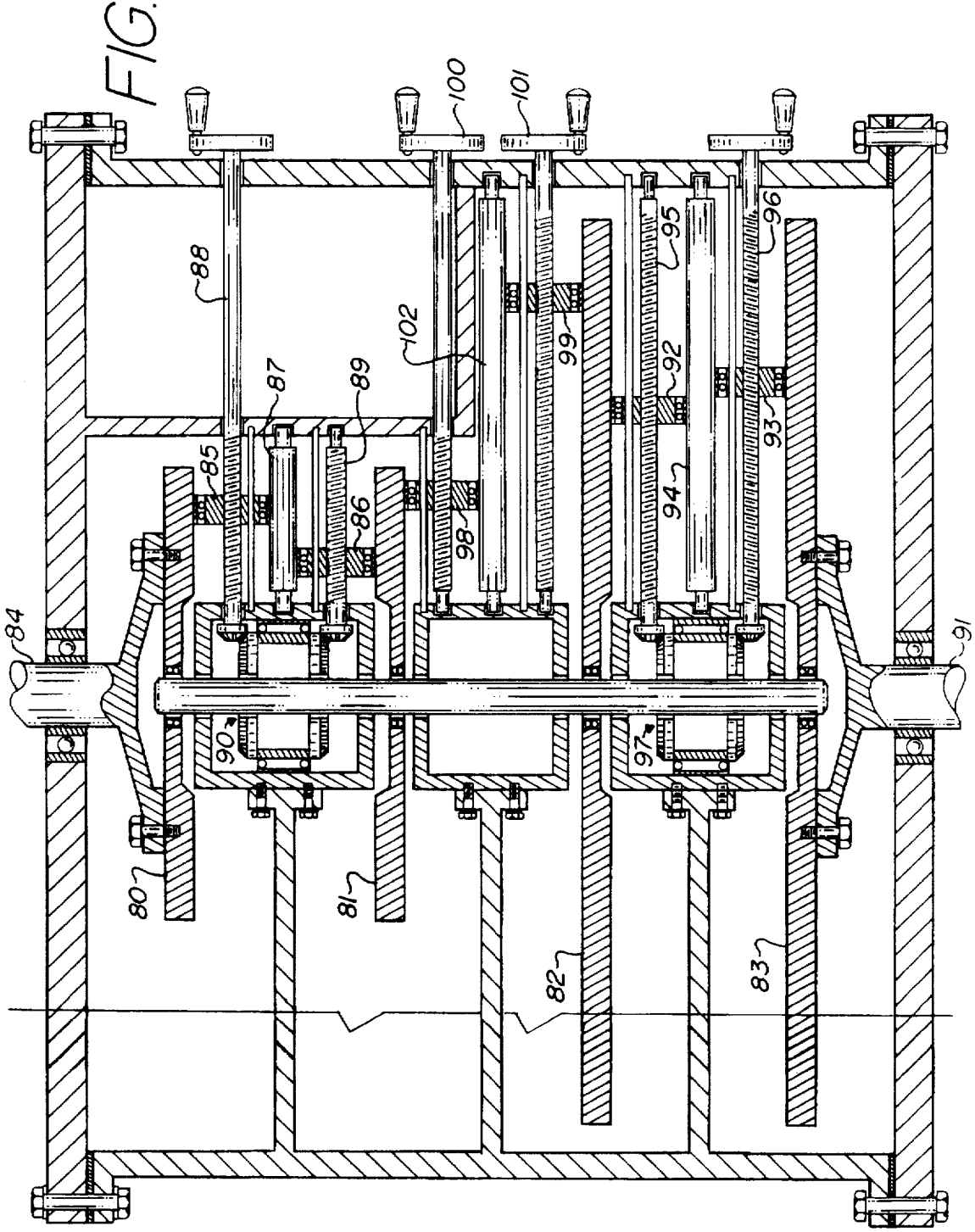

CONTINUOUSLY VARIABLE TRANSMISSION

BACKGROUND OF THE INVENTION

This is a continuation-in-part of prior application Ser. No. 08/711,990, filed Sep. 10, 1996, now abandoned.

The present invention relates to continuously variable transmissions and specifically to a continuously variable transmission having at least one pair of frictionally engaged orthogonal wheels and means for varying the ratio between the wheels.

Transmissions are commonly known mechanical components of vehicles and machinery of many types. Transmissions are employed where it is necessary to vary the torque ratios of one mechanical component against another to match; e.g., a desired speed to an efficient engine output.

The concept of employing two wheels, discs, or rollers, whose axes are orthogonal; i.e., at right angles, frictionally bearing one against the other so as to continuously vary the transfer ratio between the two is a well known principle. There are various methods, however, which are used to alter the position of one wheel, disc or roller in relation to another disc, commonly called a friction disc.

One type is shown in U.S. Pat. No. 1,410,747 issued to Gill on Mar. 28, 1922 in which a rack and pinion gear is used to vary the position of a wheel longitudinally across the face of a friction disc.

Several patents disclose an apparatus in which the position of the wheel is varied using a plate in which a spiral groove or slot changes the position of the wheel or roller across the face of the friction disc. Examples of this principle are given in U.S. Pat. No. 1,092,076, U.S. Pat. No. 1,168,057, and U.S. Pat. No. 4,137,785.

Other designs are known in which the position of the roller or wheel is varied across the face of the friction disc by means of jackscrews. One example is found in U.S. Pat. No. 3,323,384 issued to Wodarka on Jun. 6, 1967. In Wodarka the jackscrews are operated by a fairly simple gear train. This is likewise true of U.S. Pat. No. 1,738,965 issued to Reina on Dec. 10, 1929.

A device using sets of bevel gears to operate the jackscrews is found in U.S. Pat. No. 4,819,494 issued to Giuliani, et al. on Apr. 11, 1989. Giuliani does not disclose the use of two sets of friction wheels and discs mechanically connected through an idler bearing. In addition, Giuliani does not disclose using an inverse relationship between the two ratio transfer bearings to obtain a wide range of transfer ratios.

The Reina device discloses two sets of friction discs and wheels, one on the input side and one on the output side, connected through idler discs or their equivalent.

The problems and limitations of the prior art are overcome by the present invention as summarized below.

SUMMARY OF THE INVENTION

The present invention is a type of continuously variable transmission which employs the principle of two discs or wheels whose axes are at right angles to each other and which interact by friction. Moving one wheel or disc along the face of the other wheel or disc allows the "gear" ratio between the two discs or wheels to be varied continuously. In the present invention, the position of one wheel, called the ratio transfer bearing, is varied along the surface of a first wheel called the friction disc by means of a jackscrew. The jackscrew is operated by a train of bevel gears which may in turn be operated by hydraulics, electrically, manually or mechanically.

The present invention employs one friction disc and ratio transfer bearing on the input side and a second friction disc and ratio bearing on the output side. These two sets of mechanical components are connected through an idler bearing against which the two ratio transfer bearings operate. The jackscrews which move the two ratio transfer bearings are operated through the bevel gear linkages in an inverse fashion so that a higher ratio on one friction disc results in a lower ratio on the other friction disc and inversely. By varying the two transfer ratios inversely, a wider range of output ratios is obtainable.

It is therefore an object of the present invention to provide for a continuously variable transmission of the type having two orthogonal wheels frictionally bearing one against the other and the ratio between the two varied by moving one wheel frictionally across the face of the other wherein at least two such pairs of wheels are mechanically connected through an idler bearing.

A further object of the present invention is to provide for a continuously variable transmission wherein the transfer ratio between each pair of wheels is varied by means of jackscrews operated through a linkage of bevel gears such that the input ratio is varied inversely to the output ratio.

An additional object of the present invention is to provide for a continuously variable transmission having a wide range of transfer ratios.

Further objects and advantages of the present invention will be apparent from a consideration of the following detailed description of the preferred embodiments in conjunction with the appended drawings as briefly described following.

BRIEF DESCRIPTION OF THE DRAWINGS

FIG. 2 is a sectional elevation of an alternative embodiment of the present invention illustrating a configuration requiring large diameter friction discs.

FIG. 3 is a sectional elevation view of a further alternative embodiment showing the ability of the present invention to be adapted to the use of multiple trains of input and output wheel sets.

DETAILED DESCRIPTION OF THE PREFERRED EMBODIMENTS

Figure 1:
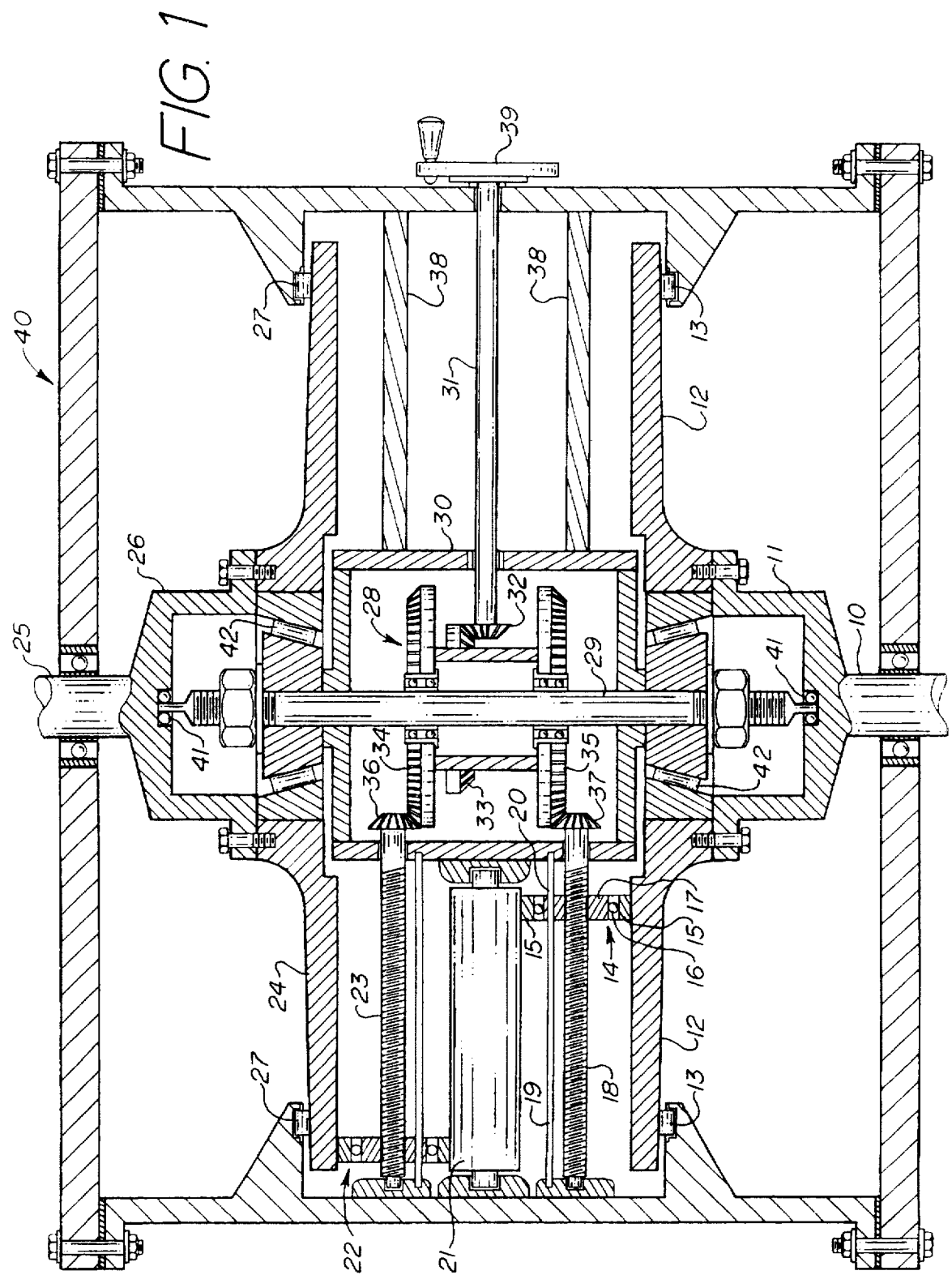
FIG. 1 is a sectional elevation view of the continuously variable transmission of the present invention.

The present invention may be described with reference to FIG. 1. The purpose of the present invention is to continuously vary the transmission of torque input to output, thereby achieving a desired bearing ratio/mechanical advantage. The transmission is accomplished through friction by varying the position of a ratio transfer bearing along the radial axis of a friction disk.

As shown in FIG. 1, an input shaft 10 is attached to the input bearing hub 11 which in turn is attached to and turns the input friction disc 12. The input friction disc 12 may be provided with a large diameter in order to achieve a wider range of transfer ratios. In order to avoid flexing of the outer edges of the input friction disc 12, the input friction disc 12 is provided with tip bearings 13 which support the outer edges against any tendency to undesirable flexion.

An input ratio transfer bearing 14 rides along the face of the input friction disc 12 and bears frictionally against the surface of the input friction disc 12. Therefore, the turning of the input friction disc 12 causes the input ratio transfer bearing to turn also. The input ratio transfer bearing 14 comprises a rim 15 which frictionally engages the surface of the input friction disc 12 and which is free to rotate on ball bearings 16 around a screw nut hub 17. The screw nut hub 17 is threadedly received on the input jackscrew 18. The screw nut hub 17 is prevented from rotating on the input jackscrew 18 by means of a keeper rod 19 which is slidingly received in an aperture 20 through the screw nut hub 17. Thus the screw nut hub 17 is constrained from rotating due to the rotation of the input ratio transfer bearing 14 or to the rotation of the input jackscrew 18. However, the rotation of the input jackscrew 18 does effect the movement of the ratio transfer bearing 14 along the face of the input friction disc 12.

The input ratio transfer bearing 14 bears frictionally against an idler bearing 21 which is mounted for free rotation. Thus rotation of the input ratio transfer bearing 14 turns the idler bearing 21 which bears frictionally against the output ratio transfer bearing 22. The output ratio transfer bearing 22 is constructed in like manner to the input ratio transfer bearing 14 so that the output ratio transfer bearing 22 is constrained to rotate only under the influence of the idler bearing 21 while free to move laterally across the face of the idler bearing 21 under the action of the output jackscrew 23.

The output ratio transfer bearing 22 bears frictionally against the output friction disc 24 which in turn is attached to and turns the output bearing hub 26 which is attached to and turns the output shaft 25. As with the input friction disc 12, the output friction disc 24 is supported on its outer edges by tip bearings 27 to avoid flexion due to the force of the output ratio transfer bearing 22 bearing against the outer edges of the friction disc 24. It is to be understood that as the invention utilizes friction to provide the mechanical connection between the various components, the amount of energy which can be transmitted by the invention depends on the degree of friction between the components which in turn is dependent on the normal force component between any two frictionally engaged components. Therefore, there is of necessity a degree of compression force holding the components tightly against one another. The larger diameter friction discs therefore are more subject to the flexion induced by these compression forces and require more support to prevent relative flexion which could prevent the frictional engagement between the friction disc and the ratio transfer bearing allowing adequate mechanical energy transfer.

Varying the position of either the input ratio transfer bearing 14 along the radial axis of the input friction disc 12 or the position of the output ratio transfer bearing 22 along the radial axis of the output friction disc 24 allows one to obtain a variable transfer ratio between the input pair of wheels (friction disc 12 and ratio transfer bearing 14) or between the output pair of wheels (friction disc 24 and ratio transfer bearing 22).

The input and output jackscrews 18, 23 are operated by a train of bevel gears so that the transfer ratios between the input pair of wheels 12, 14 and the output pair of wheels 22, 24 vary inversely. Thus a wider range of overall transfer ratios (i.e., from input shaft to output shaft) is obtainable than would be possible if the input ratios and output ratios were varied directly rather than inversely. The jackscrews 18, 23 operate in the following manner.

In the preferred embodiment, each jackscrew 18, 23 is threaded in the same manner as the other jackscrew 23, 18. For example, if input jackscrew 18 were provided with a right hand thread, output jackscrew 23 would be provided with a right hand thread also, and conversely.

The jackscrews 18, 23 are interdependent and are mechanically operated by a pinion gearing assembly 28 which is mounted on bearings around a central shaft 29 which is mounted in the center support hub 30. The pinion gearing assembly 28 receives input from a control shaft 31 which is rotated clockwise or counterclockwise depending on the desired transfer ratios. The control shaft 31 rotates bevel gear 32 which is mechanically engaged to bevel ring gear 33 which in turn causes the pinion gearing assembly 28 to rotate about the central shaft 29. Outer bevel gears 34, 35 engage jackscrew bevel gears 36, 37, respectively to effect the rotation of jackscrews 23, 18, respectively, in opposite directions. Since the jackscrews 23, 18 are threaded in the same direction, rotation of the jackscrews 23, 18 in opposite directions causes the ratio transfer bearings 14, 22 to move in opposite directions and thereby to vary the respective transfer ratios inversely. While the preferred embodiment is described with respect to jackscrews threaded with the same "handedness" and adapted to turn in opposite directions, it may be seen that the same effect; i.e., translating the ratio transfer bearings inversely, may be obtained by threading the jackscrews oppositely and causing the jackscrews to turn in the same direction. Either arrangement is intended to be encompassed within the scope of the present invention.

Although a manual wheel 39 is shown in FIG. 1 as operating the control shaft 31, the jackscrews 18, 23 may be operated hydraulically, electrically, manually, mechanically or a combination of these techniques.

Hub support rods 38 take the load of holding the center support hub 30 in place and prevent the center support hub 30 from spinning. The invention is enclosed in a case 40 to which the hub support rods 38 are attached. The central shaft 29 is provided with pilot bearings 41 at either end to support the input bearing hub 11 and the output bearing hub 26. The central shaft 29 also supports the input friction disc 12 and output friction disc 24 on support bearings 42.

FIG. 2 illustrates an alternative embodiment of the present invention in which a different mechanical arrangement utilizes the same principles to accommodate a larger friction disc and therefore larger transfer ratios. The apparatus is mounted in a case 50 which has a central hub 51 around which the input friction disc 52 and output friction disc 53 revolve. Unlike the previous embodiment, input shaft 54 frictionally drives first input ratio transfer bearing 55 which drives input friction disc 52. Friction disc 52 then drives second input ratio transfer bearing 56 which drives idler bearing 57. Idler bearing 57 drives first output ratio transfer bearing 58 which drives output friction disc 53. Output friction disc 53 then drives second output ratio transfer bearing 59 which drives output shaft 60.

The variable transfer ratios are obtained as described above in relation to the embodiment of FIG. 1 by varying the position of the ratio transfer bearings 55, 56, 58, 59 along the radial axes of the friction discs 52, 53 in inverse manner as described previously. First input ratio transfer bearing 55 and second output transfer bearing 59 operate together, while second input ratio transfer bearing 56 and first output ratio transfer bearing 58 operate together. First jackscrew shaft 61 controls the position of second output ratio transfer bearing 59 directly and operates first gear assembly 62 to rotate central shaft 63 which in turn operates second gear assembly 64 to rotate second jackscrew shaft 65 to control the position of first input ratio transfer bearing 55 inversely to the motion of second output ratio transfer bearing 59. Similarly, third jackscrew shaft 66 controls the position of second input ratio transfer bearing 56 directly and operates third gear assembly 67 which is mounted on central gear support hub 68 which revolves about central shaft 63. The action of third gear assembly 67 acts on fourth gear assembly 69 to rotate fourth jackscrew shaft 70 to control the position of first output ratio transfer bearing 58 in inverse fashion to the position of second input ratio transfer bearing 56.

The construction and operation of the ratio transfer bearings in the embodiment of FIG. 2 is otherwise identical to the ratio transfer bearings as described above with respect to the embodiment of FIG. 1.

Both the embodiments of FIGS. 1 and 2 require clutch or disconnect capability at the respective output shafts to allow the ratio transfer bearings to be moved by the jackscrews. Unless the output shafts and other components are spinning the ratio transfer bearings can only be moved against the frictional engagement of the ratio transfer bearings to the shafts. If the components are spinning, however, the ratio transfer bearings are able to move in a spiraling fashion without significant frictional resistance.

FIG. 3 shows the ability of the present invention to combine "sets" of the basic friction discs, ratio transfer bearings and idler bearings to drive different sized friction disc "sets" and operate in series to obtain larger transfer ratios.

In the embodiment illustrated in FIG. 3, a first "set" of components with a relatively small diameter set of friction discs 80, 81 is coupled serially to a second "set" of components with a larger set of friction discs 82, 83. Input shaft 84 input friction disc 80 which, through ratio transfer bearings 85, 86 and idler bearing 87, drives output friction disc 81. As with the embodiment of FIG. 1, jackscrews 88, 89 are linked mechanically through bevel gear assembly 90 so that the ratio transfer bearings 85, 86 move radially across the respective friction discs 80, 81 in inverse fashion.

Similarly, the second "set" of components with a relatively large diameter of friction discs 82, 83 drives the output shaft 91 through ratio transfer bearings 92, 93, idler bearing 94, and jackscrews 95, 96 mechanically linked through bevel gear assembly 97. Linkage between the first "set" and the second "set" of components is accomplished by means of linkage ratio transfer bearings 98, 99 which may be individually adjusted through control jackscrews 100, 101, respectively. Linkage ratio transfer bearings 98, 101 are frictionally linked through linkage idler bearing 102.

The present invention has been described with reference to certain preferred and alternative embodiments which are considered exemplary only and not limiting to the full scope of the invention as set forth in the appended claims.

What is claimed is:

1. A continuously variable transmission, comprising:
    an input friction disc mounted to an input shaft for rotation about an axis of said input shaft and having a friction surface perpendicular to said axis of said input shaft;
    a first ratio transfer bearing mounted for rotation about a first axis parallel to said friction surface of said input friction disc and frictionally engaging said friction surface and further being mounted for translational movement along said first axis;
    an idler bearing mounted for rotation about a second axis parallel to said friction surface of said input friction disc and frictionally engaging said first ratio transfer bearing;
    a second ratio transfer bearing mounted for rotation about a third axis parallel to said friction surface of said input friction disc and frictionally engaging said idler bearing and further being mounted for translational movement along said third axis;
    an output friction disc mounted to an output shaft for rotation about an axis of said output shaft and having a friction surface perpendicular to said axis of said output shaft and further frictionally engaging said second ratio transfer bearing; and
    means connected to said first ratio transfer bearing and to said second ratio transfer bearing for translational movement of said first ratio transfer bearing and said second ratio transfer bearing whereby translational movement of said first ratio transfer bearing relative to said axis of said input shaft is in inverse relationship to translational movement of said second ratio transfer bearing relative to said axis of said input shaft.

2. The continuously variable transmission of claim 1 wherein said first and second ratio transfer bearings each comprise a rim freely rotatable on a screw nut hub, said means connected to said first ratio transfer bearing and to said second ratio transfer bearing for translational movement comprises a jackscrew threadedly received in each screw nut hub and means to rotate each of said jackscrews, and means to prevent said screw nut hubs from rotating.

3. The continuously variable transmission of claim 2 wherein said means to rotate each of said jackscrews comprises a bevel gear assembly connected to both of said jackscrews whereby rotation of said bevel gear assembly rotates said jackscrews.

4. The continuously variable transmission of claim 3 wherein said means to prevent said screw nut hubs from rotating comprises a hole in said screw nut hub receiving a keeper rod having an axis parallel to said first axis whereby said screw nut hub is freely translatable parallel to said first axis while being restrained from rotational motion.

5. The continuously variable transmission of claim 4 further comprising tip bearings to prevent deflection of said input friction disc and said output friction disc.

6. A continuously variable transmission, comprising:
    an input friction shaft mounted for rotation about a first axis of said input friction shaft and having a cylindrical friction surface;
    a first ratio transfer bearing mounted for rotation about a second axis parallel to said first axis of said input friction shaft and frictionally engaging said cylindrical friction surface and further being mounted for translational movement along said second axis;
    an input friction disc mounted for rotation about a third axis perpendicular to said first axis and said second axis and frictionally engaging said first ratio transfer bearing;
    a second ratio transfer bearing mounted for rotation about a fourth axis parallel to said first axis and said second axis frictionally engaging said input friction disc and further being mounted for translational movement along said fourth axis; and
    means connected to said first ratio transfer bearing and to said second ratio transfer bearing for translational movement of said first ratio transfer bearing and said second ratio transfer bearing whereby translational movement of said first ratio transfer bearing relative to said third axis of said input friction disc is in inverse relationship to translational movement of said second ratio transfer bearing relative to said third axis of said input friction disc.

7. The continuously variable transmission of claim 6, further comprising:
- an idler bearing mounted for rotation about a fifth axis parallel to said first axis and frictionally engaging said second ratio transfer bearing;
- a third ratio transfer bearing mounted for rotation about a sixth axis parallel to said first axis and frictionally engaging said idler bearing and further being mounted for translational movement along said sixth axis;
- an output friction disc mounted for rotation about a seventh axis perpendicular to said first axis and frictionally engaging said third ratio transfer bearing;
- a fourth ratio transfer bearing mounted for rotation about an eighth axis parallel to said first axis and frictionally engaging said output friction disc and further being mounted for translational movement along said eighth axis;
- an output friction shaft mounted for rotation about a ninth axis parallel to said first axis and having a cylindrical friction surface frictionally engaging said fourth ratio transfer bearing; and
- means connected to said third ratio transfer bearing and to said fourth ratio transfer bearing for translational movement of said third ratio transfer bearing and said fourth ratio transfer bearing whereby translational movement of said third ratio transfer bearing relative to said sixth axis is in inverse relationship to translational movement of said fourth ratio transfer bearing relative to said eighth axis.

8. The continuously variable transmission of claim 7 wherein said first, second, third, and fourth ratio transfer bearings each comprise a rim freely rotatable on a screw nut hub, said means connected to said third ratio transfer bearing and to said fourth ratio transfer bearing for translational movement comprises a jackscrew threadedly received in each screw nut hub and means to rotate each of said jackscrews, and means to prevent said screw nut hubs from rotating.

9. The continuously variable transmission of claim 8 wherein said means to rotate each of said jackscrews comprises a bevel gear assembly connected to both of said jackscrews whereby rotation of said bevel gear assembly rotates said jackscrews.

10. The continuously variable transmission of claim 9 wherein said means to prevent said screw nut hubs from rotating comprises a hole in said screw nut hub receiving a keeper rod having an axis parallel to said first axis whereby said screw nut hub is freely translatable parallel to said first axis while being restrained from rotational motion.

11. The continuously variable transmission of claim 10 further comprising tip bearings to prevent deflection of said input friction disc and said output friction disc.

* * * * *